US007038814B2

(12) United States Patent
Huovinen

(10) Patent No.: US 7,038,814 B2
(45) Date of Patent: May 2, 2006

(54) FAST DIGITAL IMAGE DITHERING METHOD THAT MAINTAINS A SUBSTANTIALLY CONSTANT VALUE OF LUMINANCE

(75) Inventor: Jaakko Huovinen, Oulu (FI)

(73) Assignee: Nokia Corporation, Espoo (FI)

( * ) Notice: Subject to any disclaimer, the term of this patent is extended or adjusted under 35 U.S.C. 154(b) by 958 days.

(21) Appl. No.: 10/104,963

(22) Filed: Mar. 21, 2002

(65) Prior Publication Data

US 2003/0179393 A1 Sep. 25, 2003

(51) Int. Cl.
*G06K 15/00* (2006.01)
*G06K 9/36* (2006.01)

(52) U.S. Cl. ..................... 358/1.9; 358/3.19; 382/3.26; 382/274

(58) Field of Classification Search ................. 358/1.9, 358/3.13, 3.14, 3.15, 3.16, 3.19, 3.26, 530, 358/463; 382/251, 252, 274, 275
See application file for complete search history.

(56) References Cited

U.S. PATENT DOCUMENTS 3,078,340 A * 2/1963 Willey ......................... 348/32
3,354,266 A * 11/1967 Dinenno ....................... 348/26
6,906,727 B1 * 6/2005 Weibrecht et al. .......... 345/600
2002/0131634 A1 * 9/2002 Weibrecht et al. .......... 382/162
2003/0179393 A1 * 9/2003 Huovinen ................... 358/1.9
2004/0062437 A1 * 4/2004 Luo et al. ................... 382/166

OTHER PUBLICATIONS

Rec. ITU-R BT.601-5 Studio Encoding Parameters of Digital Television For Standard 4:3 And Wide-Screen 16:9 Aspect Ratios; 1982-1986-1990-1994-4995.

* cited by examiner

*Primary Examiner*—Jerome Grant, II
(74) *Attorney, Agent, or Firm*—Harrington & Smith, LLP

(57) ABSTRACT

A method and system are disclosed for displaying Y-bit coded RGB image data that is received as X-bit coded RGB or YCbCr image data, where X>Y. The method includes receiving X-bit coded image data, where each color channel comprises m-bits; arithmetically processing the image data to include dithering noise values that result in maintaining the luminance of the image data substantially constant; converting the YCbCr image data to RGB image data, and quantizing the image data to Y-bit coded RGB image data where each color channel comprises n-bits. For example, X=24 and Y=12. The step of arithmetically processing includes, for the RGB case and for each pixel, generating an integer random number lying in the range of [−Q/2 . . . Q/2], where Q is a quantization step size; adding the random number to each of the Red and Blue color channels, and subtracting the random number from the Green color channel; and truncating and clipping the result in each color channel. Preferably, $Q=2^{(m-n)}$. Preferably, the step of truncating truncates the value in each color channel to n-bits, and clipping clips the truncated values to lie in the range of [0 . . . $2^n-1$]. For the YCbCr case the processing step adds the random number to each of the Cb and Cr color channels, and converts the YCbCr color channels to RGB color channels. In a most preferred embodiment the step of receiving receives the X-bit coded RGB image data from a RF cellular telecommunications channel, and the steps of quantizing and arithmetically processing are performed within a cellular telephone.

30 Claims, 4 Drawing Sheets

FAST DIGITAL IMAGE DITHERING METHOD THAT MAINTAINS A SUBSTANTIALLY CONSTANT VALUE OF LUMINANCE

TECHNICAL FIELD

These teachings relate generally to image pixel processing techniques and, more specifically, relate to the dithering of image pixel data and to techniques for compensating for quantization induced errors that occur when X-bit coded Red, Green, Blue (RGB) image data is converted to Y-bit coded RGB image data, where A>Y (e.g., X=24 and Y=12). These teachings apply as well to image pixel data that is encoded in other than the RGB format, such as the YCbCr format.

BACKGROUND

Problems arise when it becomes necessary or desirable to quantize digital image data, such as when one wishes to display 24-bit encoded RGB image data on a 12-bit RGB display. Problems also occur due to the presence of block boundaries in connection with the encoding of a digital image using a block-based transform coding (for example, JPEG, H.263, MPEG-4, etc.).

Digital images are typically coded using a 24-bit RGB color palette, where each of the RGB channels is coded with eight bits. This coding scheme yields 256 levels of intensity for each of the red, green and blue channels, and a total of $256^3=16777216$ different colors, a number that is usually more than sufficient to represent all of the colors in the visible spectrum. However, in some cases the image data is to be represented using a display with, for example, only a 12-bit color palette (3*4-bits/channel or 16 levels of intensity per RGB channel). A fast (and low-quality) technique to convert the 24-bit RGB image to 12 bits simply linearly quantizes the 256 levels to 16 levels, by using the following equations:

$$R_{4bit}(x,y)=R_{8bit}(x,y)>>4$$

$$G_{4bit}(x,y)=G_{8bit}(x,y)>>4, \text{ where x and y are the image coordinates}$$

$$B_{4bit}(x,y)=B_{8bit}(x,y)>>4$$

It can readily be shown that a result of such a linear 24-bit to 12-bit quantization is a limited number of colors and the presence of objectionable block artifacts in the resulting displayed image.

A typical technique to improve the subjective quality of the palette quantization process is to use color dithering. Although there are numerous different color dithering techniques, all of them are based on the same general idea: if two pixels with slightly different colors are viewed from a distance, the eye sees them as one pixel, whose color is an average of the two colors. As an example, FIG. 1 illustrates a grey-scale ramp that is represented using two colors and dithering.

Thus, in color dithering the colors that are missing from the quantized palette are simulated by alternating between two neighboring colors. This alternating between two colors can be done in various ways, such as by adding a fixed dithering noise pattern, also referred to as “ordered dithering”, or by adding a random dithering noise pattern (white noise or high frequency noise, also called blue noise) to each of the RGB channels before quantization, where the maximum amplitude of dithering noise values is one half of the quantization step. The following equations describe the process for 24-bit to 12-bit conversion. In practice, the results for each channel would be clipped to lie in the range of zero to 15.

$$R_{4bit}(x,y)=(R_{8bit}(x,y)+\text{noise}_R(x,y))>>4$$

$$G_{4bit}(x,y)=(G_{8bit}(x,y)+\text{noise}_G(x,y))>>4, \text{ where } (-8<\text{noise}_{R,G,B}(x,y)<8)$$

$$B_{4bit}(x,y)=(B_{8bit}(x,y)+\text{noise}_B(x,y))>>4$$

By the use of, for example, a fixed 2×2 pixel dithering noise pattern the apparent number of colors is increased as compared to the linear quantization approach, and the objectionable block artifacts in the resulting displayed image are slightly less visible.

However, neither of these approaches is optimum, as the resulting displayed images still contain objectionable block artifacts, and the range of apparent colors is still not optimum.

Those skilled in the art will recognize that the foregoing description of dithering is greatly simplified. For example, also well known is the error diffusion model that attempts to minimize, by using an error filter feedback approach, the error diffused by the noise in the image. Examples of suitable filters for implementing this approach are the Floyd-Steinberg, the Jarvis-Judice-Ninke, the Stucki and the Stevenson.

The above mentioned ordered dithering approach compares the original patterns from the image to a predetermined periodic array, where the coefficients of the array are the thresholds (which are known a priori and are thus “ordered”). The ordered dithering method is divided generally into two classes: dispersed (typically used in visual, e.g., computer, displays) and clustered (typically used in printers).

While the thresholding quantization and white noise techniques typically have the fastest execution times, as compared to the ordered dithering and the error diffusion approaches, they generally produce an inferior image to that produced by the ordered dithering and the error diffusion approaches.

Important factors when selecting a dithering method are the speed of execution (computational complexity), when considering the size of the display (i.e., the number of pixels) and the processing capabilities of the available data processor(s), as well as the visual quality of the resulting displayed image. Related to execution speed and computational complexity is the power consumption, particularly in the case of portable battery powered devices such as mobile (cellular) telephones, personal digital assistants, personal communicators and the like. The issue of power consumption will become even more important in modern cellular telephones, as multimedia standards are evolving to enable these devices to receive and display color video and other image data, such as image data obtained through a wireless packet data link from the Internet. However, these devices typically have a smaller display that is less capable than the high resolution displays found in computer graphics and other types of terminals, resulting in a need to quantize the received image data to accommodate the lower resolution display. The use of quantization, however, will lead to reductions in image quality and thus to a requirement to apply dithering in order to enhance the quality of the displayed image. As such, it can be realized that a need has arisen to provide an improved dithering technique that overcomes the foregoing and other problems that exist in currently available dithering techniques.

SUMMARY OF THE PREFERRED EMBODIMENTS

The foregoing and other problems are overcome, and other advantages are realized, in accordance with the presently preferred embodiments of these teachings.

A method is disclosed for displaying Y-bit coded RGB image data that is received as X-bit coded RGB or YCbCr image data, where X>Y. The method includes receiving X-bit coded RGB or YCbCr image data, where each color channel comprises m-bits; arithmetically processing the image data to include dithering noise values that result in maintaining the luminance of the image data substantially constant; and quantizing the received image data to form Y-bit coded RGB image data where each color channel comprises n-bits. For example, X=24 and Y=12. The step of arithmetically processing includes, for each pixel, generating an integer random number lying in the range of [−Q/2 . . . Q/2], where Q is a quantization step size; and when the format is RGB, adding the random number to each of the Red and Blue color channels, subtracting the random number from the Green color channel and truncating and clipping the result in each color channel. Preferably, $Q=2^{(m-n)}$. Preferably, the step of truncating truncates the value in each color channel to n-bits, and the clipping operation clips the truncated values to lie in the range of $[0 \ldots 2^n-1]$.

When YCbCr image data is arithmetically processed the random number is added to both the Cb and Cr channels, and the Y channel value is not changed. The arithmetically processed YCbCr image data is converted to RGB data before quantization. The preferred conversion equations are known in the art, and defined in ITU-R Recommendation BT.601-5.

Note that the quantization operation can be performed by a truncation operation where right shift operations are performed on the arithmetically processed image data. However, the quantization coefficient is not limited to being a power of two.

In the preferred embodiment the step of receiving receives the X-bit coded RGB or YCbCr image data from a wireless communication channel, such as a radio frequency (RF) communication channel, and the steps of quantizing and arithmetically processing are performed within a mobile station.

In a most preferred embodiment the step of receiving receives the X-bit coded RGB or YCbCr image data from a RF cellular telecommunications channel, and the steps of quantizing and arithmetically processing are performed within a cellular telephone.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The improved dithering method described herein has been found to provide significantly improved subjective quality for an H.263-encoded digital video image, after decoding. The image is assumed to be in 24-bit RGB or YCbCr format (8 bits/channel), and the resolution of the displayed image is assumed to be no more than 176×144 pixels. These specific parameters are not, however, intended to be read as a limitation on the practice of this invention. More generally, the use of the method of this invention improves the visual quality of a displayed image, where RGB or YCbCr data is converted from a 24-bit format to a format suitable for a 12-bit display.

Figure 2A:
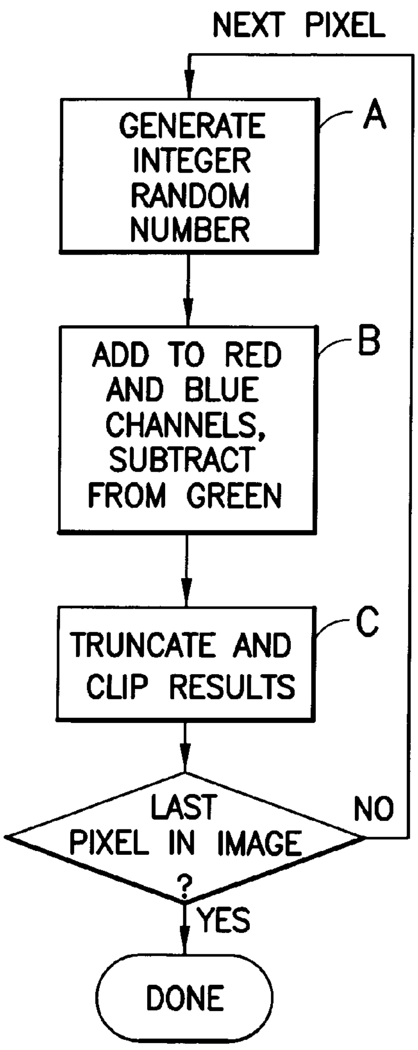
FIG. 2A is a logic flow diagram showing a method of this invention when RGB image data is received.

A description will first be made using FIGS. 2A and 3A of the RGB image data embodiment. Having gained an understanding of the operation of the invention in this context, a description will then be made of the YCbCr embodiment in reference to FIGS. 2B and 3B.

As was discussed above, a problem that is encountered in color dithering is the visibility of the dithering pattern. The inventor has realized that the visibility of the dithering pattern can be reduced by utilizing the fact that the human eye is more sensitive to variations in the luminance (brightness) than to changes in the individual red, green or blue values. The luminance value (Y) of an RGB pixel can be calculated (approximately) with the following equation:

$$Y=0.3*R+0.6*G+0.1*B$$

The weights 0.3, 0.6 and 0.1 for red, green and blue, respectively, correspond to the eyes sensitivity to these primary colors. As such, to make the dithering pattern less visible the dithering noise values are selected so that the luminance value of the quantized RGB pixels stays approximately constant:

$$0.3*\text{noise}_R+0.6*\text{noise}_G+0.1*\text{noise}_B=0,$$

which holds true (approximately), when:

$$\text{noise}_R=\text{noise}_B=-\text{noise}_G.$$

Thus, the 24-bit to 12-bit conversion equations may be written as:

$$R_{4bit}(x,y)=(R_{8bit}(x,y)+\text{noise}(x,y))>>4$$

$$G_{4bit}(x,y)=(G_{8bit}(x,y)-\text{noise}(x,y))>>4, \text{ where } (-8<\text{noise}(x,y)<8)$$

$$B_{4bit}(x,y)=(B_{8bit}(x,y)+\text{noise}(x,y))>>4.$$

Using this improved dithering method it can be observed that, when the value of noise(x,y) is random, the dithering noise pattern is less visible and the block artifacts are also attenuated, as compared to the conventional quantization technique that uses a fixed dithering pattern that is added prior to quantization.

It should be noted that there are a number of dithering algorithms, such as the above-mentioned error-diffusion dithering technique, that may produce comparable results, but in general these conventional approaches are computationally far more complex.

Referring now to the logic flow diagram of FIG. 2A, an improved method for converting a digital RGB image having m-bits per channel to a RGB image having n-bits per channel proceeds as follows.

Step A: The method generates an integer random number lying in the range of [−Q/2 . . . Q/2], where Q is the quantization step size. The quantization step size is defined as $Q=2^{(m-n)}$, where m is the number bits per channel in the source image, and n is the number of bits per channel in the destination image. As an example, if a red value is to be quantized from 8-bits to 4-bits, $Q=2^{(8-4)}=16$.

Step B: The method then adds the random number from Step A to the red and blue channels, and subtracts the random number from the green channel.

Step C: A next step truncates the red, green and blue values to n-bits, and clips the resultant values to lie in the range of $[0 \ldots 2^n-1]$.

Steps A, B and C are then repeated for each displayed pixel.

Figure 1:
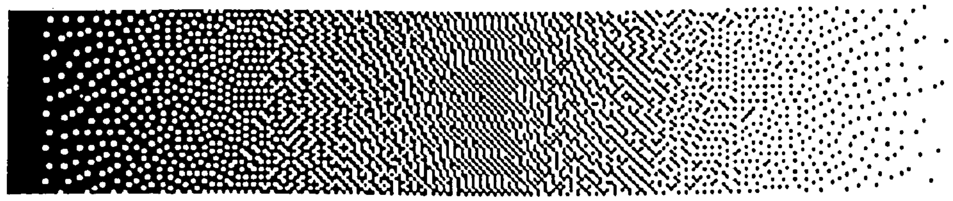
FIG. 1 illustrates a conventional grey-scale ramp that is represented using two colors and dithering.
Figure 4:
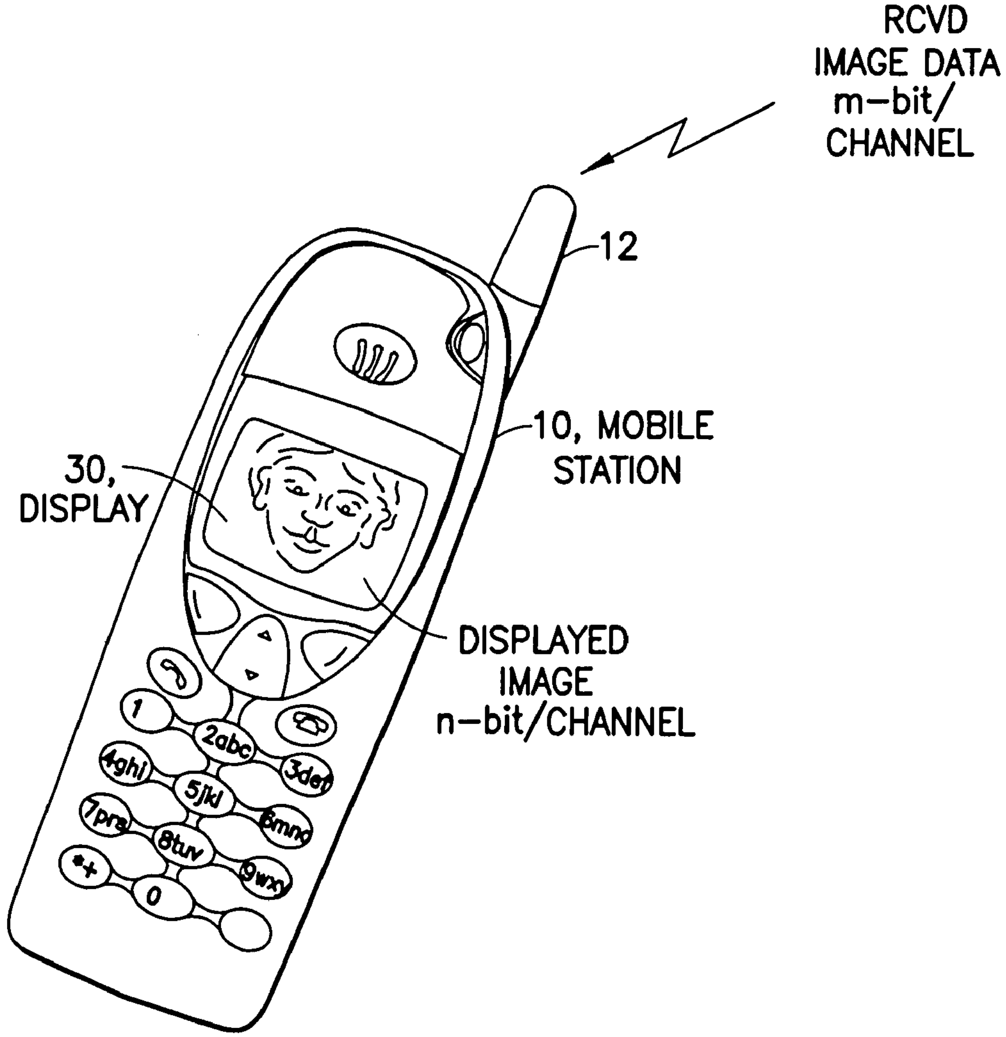
FIG. 4 is an external view of the mobile station shown in FIGS. 3A and 3B.
Figure 3A:
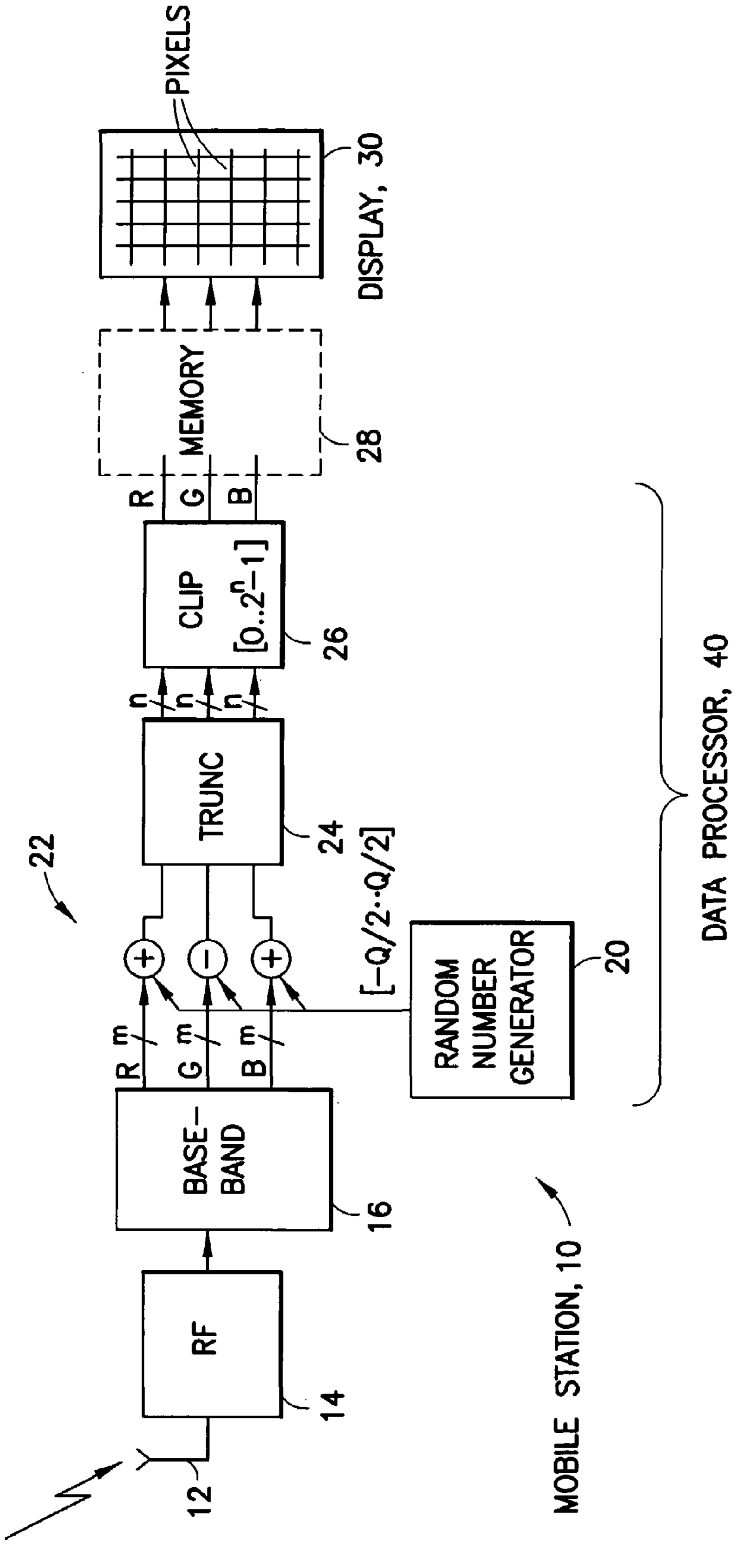
FIG. 3A is a block diagram showing a portion of a mobile station constructed so as to perform color dithering in accordance with this invention when RGB image data is received.

FIG. 3A shows a portion of an exemplary mobile station 10, such as a cellular telephone of a general type shown in FIG. 4. The mobile station 10 is assumed to include a color display 30, such as an LCD display having an 8-bit palette and a resolution of, for example, 176×144 pixels. An antenna 12 receives an RF signal that is modulated so as to convey 24-bit RGB image data. The image data could be, for example, a video clip, an image transmitted in real time from a digital camera, or it could be an image contained within a web page. An RF block 14 includes a receiver that amplifies the received signal and then downconverts and demodulates the received signal. A baseband block 16 decodes the demodulated signal and outputs digital data. While in a typical mobile station the received digital data will include wireless network signalling information and voice and/or packet data, of interest to this invention is the received RGB image data, assumed to be in the 24-bit format (m=8).

A random number generator 20 operates for each pixel output from the baseband block 16 to generate the integer random number lying in the range of $[-Q/2 \ldots Q/2]=[-2^{(m-n-1)} \ldots 2^{(m-n-1)}]$, where Q is the quantization step size, defined as $Q=2^{(m-n)}$, where m is the number bits per channel in the source (received) image, and n is the number of bits per channel in the displayed image. The random number is applied to an arithmetic block 22 where it is added to the m-bit red and blue channel values, and is subtracted from the m-bit green channel value. The result of this operation is to maintain the luminance value of the quantized RGB pixels substantially constant.

The arithmetically processed RGB data is then quantized with the quantization step size Q, defined as $Q=2^{(m-n)}$, as described above. In the presently preferred embodiment the quantization operation is performed by a truncation unit 24, where truncation is performed by shifting the values right by (m−n) bits. The output of the truncation unit 24 is n-bit RGB image data in the 12-bit format (n=4). The resulting RGB values are clipped in block 26 to lie in the range of $[0 \ldots 2^n-1]$. At this point the RGB pixel values can be driven directly to the display 30 for providing real time operation, or they may be buffered first in an image memory 28.

While not shown, a pre-quantizer could be employed to reduce the number of colors in the received image.

Figure 2B:
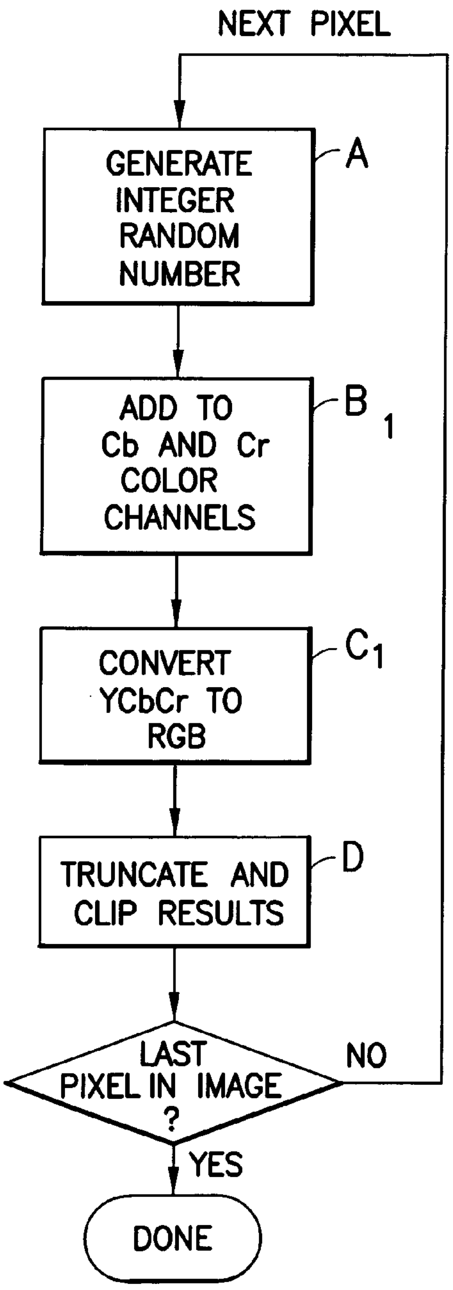
FIG. 2B is a logic flow diagram showing a method of this invention when YCbCr image data is received.
Figure 3B:
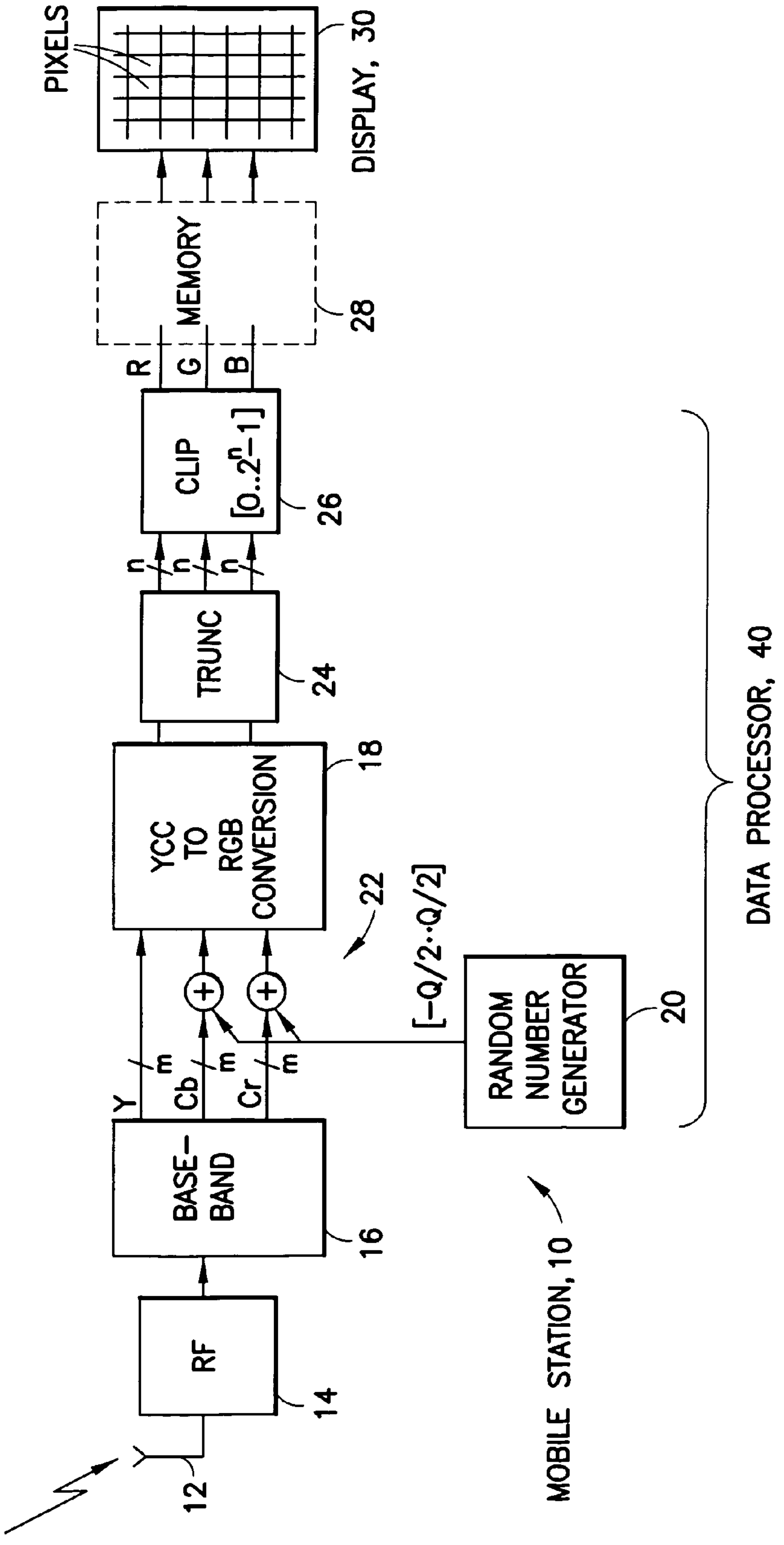
FIG. 3B is a block diagram showing a portion of a mobile station constructed so as to perform color dithering in accordance with this invention when YCbCr image data is received.

Referring to FIGS. 2B and 3B, the YCbCr embodiment is now discussed. Step $B_1$ is modified from the Step B of FIG. 2A to add the random number to both the Cb and Cr channels, while the Y channel value is not changed. Step $C_1$ converts the YCbCr values to RGB values using known conversion equations as defined in ITU-R Recommendation BT.601-5. At Step D the converted values are truncated and clipped as discussed above. These modifications are reflected in the block diagram of FIG. 3B, where the arithmetic unit 22 is modified to include only the two adders for the Cb and Cr channels, and a YCbCr to RGB conversion block 18 is added before the truncation block 24. In all other respects the block diagram can be identical to the block diagram of FIG. 3A.

It should be noted that the quantization operation can be performed by the truncation operation, as illustrated, where right shift operations are performed on the arithmetically processed image data. However, the quantization coefficient is not limited to being a power of two, and in this case quantization is not performed by a right bit-shift operation, but by some other suitable technique.

Furthermore, the image data need not be expressed in the YCbCr format, but could be expressed in some other luminance/chrominance format.

While shown as a plurality of discrete circuit blocks, it should be realized that the functionality of all or some of the random number generator 20, arithmetic block 22, truncation block 24 and clipper 26 can be implemented by other types of circuitry, such as a suitably programmed mobile station data processor 40, and/or by a special purpose graphics data processor, and/or by an image processor ASIC.

In contradistinction to the prior art color dithering algorithms that were discussed above, the presently preferred color dithering algorithm reduces the visibility of the dithering noise pattern by maintaining the luminance value of the displayed RGB pixels substantially constant. The presently preferred color dithering algorithm also yields a good trade-off between computational complexity and visual quality, making it suitable for real-time applications, as well as for use in power limited terminals, such as cellular telephones and other hand-held devices capable of displaying color images.

While described above in the context of certain digital image encoding schemes, numbers of bits per pixel, numbers of pixels, etc., these specific parameters are merely exemplary of the presently preferred embodiments, and are not to be construed in a limiting fashion upon the practice of this invention. Thus, while those having skill in the art may derive various changes in the form and details of the preferred embodiments, when guided by the foregoing teachings, any such changes will still fall within the scope of this invention.

What is claimed is:

1. A method for displaying Y-bit coded Red, Green, Blue RGB image data that is received as X-bit coded image data, where X>Y, comprising:

receiving X-bit coded image data, where each color channel comprises m-bits;

arithmetically processing the received image data to include dithering noise values that result in maintaining the luminance of the image data substantially constant; and quantizing the received image data to Y-bit coded RGB image data, where each color channel comprises n-bits.

2. A method as in claim 1, where X=24 and Y=12.

3. A method as in claim 1, where the X-bit coded image data is received as RGB image data, and the step of arithmetically processing comprises, for each pixel:

generating an integer random number lying in the range of [−Q/2 . . . Q/2], where Q is a quantization step size;

adding the random number to each of the Red and Blue color channels, and subtracting the random number from the Green color channel; and truncating and clipping the result in each color channel.

4. A method as in claim 3, where $Q=2^{(m-n)}$.

5. A method as in claim 4, where Q=16.

6. A method as in claim 3, where truncating truncates the value in each color channel to n-bits, and where clipping clips the truncated values to lie in the range of $[0 \ldots 2^n-1]$.

7. A method as in claim 1, where the X-bit coded image data is received as YCbCr image data, and the step of arithmetically processing comprises, for each pixel:

generating an integer random number lying in the range of [−Q/2 . . . Q/2], where Q is a quantization step size;

adding the random number to each of the Cb and Cr color channels;

converting the resultant values to RGB image data; and truncating and clipping the result in each color channel.

8. A method as in claim 7, where $Q=2^{(m-n)}$.

9. A method as in claim 8, where Q=16.

10. A method as in claim 7, where truncating truncates the value in each color channel to n-bits, and where clipping clips the truncated values to lie in the range of $[0 \ldots 2^n-1]$.

11. A method as in claim 1, where the step of receiving receives the X-bit coded image data from a wireless communication channel.

12. A method as in claim 1, where the step of receiving receives the X-bit coded image data from a radio frequency communication channel, and where the steps of arithmetically processing and quantizing are performed within a mobile station.

13. A method as in claim 1, where the step of receiving receives the X-bit coded image data from a radio frequency cellular telecommunications channel, and where the steps of arithmetically processing and quantizing are performed within a cellular telephone.

14. A system for displaying Y-bit coded Red, Green, Blue (RGB) image data that is received as X-bit coded image data, where X>Y, comprising a receiver for receiving X-bit coded image data where each color channel comprises m-bits; an arithmetic processor for processing the quantized image data to include dithering noise values that result in maintaining the luminance of the quantized image data substantially constant; and a quantizer having an input coupled to an output of the processor for quantizing the image data to Y-bit coded RGB image data, where each color channel comprises n-bits.

15. A system as in claim 14, where X=24 and Y=12.

16. A system as in claim 14, where the X-bit coded image data is received as RGB image data, and where said processor operates to generate an integer random number lying in the range of [−Q/2 . . . Q/2], where Q is a quantization step size; to add the random number to each of the Red and Blue color channels, and to subtract the random number from the Green color channel; and to truncate and clip the result in each color channel.

17. A system as in claim 16, where $Q=2^{(m-n)}$.

18. A system as in claim 16, where Q=16.

19. A system as in claim 16, where truncating truncates the value in each color channel to n-bits, and where clipping clips the truncated values to lie in the range of $[0 \ldots 2^n-1]$.

20. A system as in claim 14, where the X-bit coded image data is received as YCbCr image data, and where said processor operates to generate an integer random number lying in the range of [−Q/2 . . . Q/2], where Q is a quantization step size; to add the random number to each of the Cb and Cr color channels, and to truncate and clip the result in each color channel.

21. A system as in claim 20, where $Q=2^{(m-n)}$.

22. A system as in claim 20, where Q=16.

23. A system as in claim 20, where truncating truncates the value in each color channel to n-bits, and where clipping clips the truncated values to lie in the range of $[0 \ldots 2^n-1]$.

24. A system as in claim 14, where the receiver receives the X-bit coded image data from a wireless communication channel.

25. A system as in claim 14, where the receiver receives the X-bit coded image data from a radio frequency communication channel, and where the processor is a part of a mobile station.

26. A system as in claim 14, where the receiver receives the X-bit coded image data from a radio frequency cellular telecommunications channel, and where the processor is a part of a cellular telephone.

27. A wireless device comprising a display for displaying Y-bit coded Red, Green, Blue (RGB) pixels and a receiver for receiving X-bit coded RGB color channel data from a radio frequency communications channel, where X>Y and where each received color channel comprises m-bits, circuitry that operates, for each pixel, to generate an integer random number lying in the range of [−Q/2 . . . Q/2], where Q is a quantization step size; to add the random number to each of the Red and Blue color channels, and to subtract the random number from the Green color channel; and to quantize and clip the result in each color channel to form the Y-bit coded RGB color channel data, where each quantized RGB color channel comprises n-bits.

28. A wireless device as in claim 27, where $Q=2^{(m-n)}$, where said circuitry truncates the value in each color channel to n-bits and clips the truncated values to lie in the range of $[0 \ldots 2^n-1]$.

29. A wireless device comprising a display for displaying Y-bit coded Red, Green, Blue (RGB) pixels and a receiver for receiving X-bit coded YCbCr color channel data from a radio frequency communications channel, where x>Y and where each received color channel comprises m-bits, circuitry that operates, for each pixel, to generate an integer random number lying in the range of [−Q/2 . . . Q/2], where Q is a quantization step size; to add the random number to each of the Cb and Cr color channels, to convert the YCbCr color channels to RGB color channels, and to quantize and clip the result in each color channel to form the Y-bit coded RGB color channel data, where each quantized RGB color channel comprises n-bits.

30. A wireless device as in claim 29, where $Q=2^{(m-n)}$, where said circuitry truncates the value in each color channel to n-bits and clips the truncated values to lie in the range of $[0 \ldots 2^n-1]$.

* * * * *